April 27, 1948.  V. V. JACOMINI  2,440,475

PROCESS AND APPARATUS FOR CONTINUOUS CATALYSIS

Filed Jan. 8, 1944   3 Sheets-Sheet 1

INVENTOR.
Virgil V. Jacomini
BY
Philip Subkow
ATTORNEY.

April 27, 1948.   V. V. JACOMINI   2,440,475
PROCESS AND APPARATUS FOR CONTINUOUS CATALYSIS
Filed Jan. 8, 1944   3 Sheets-Sheet 2
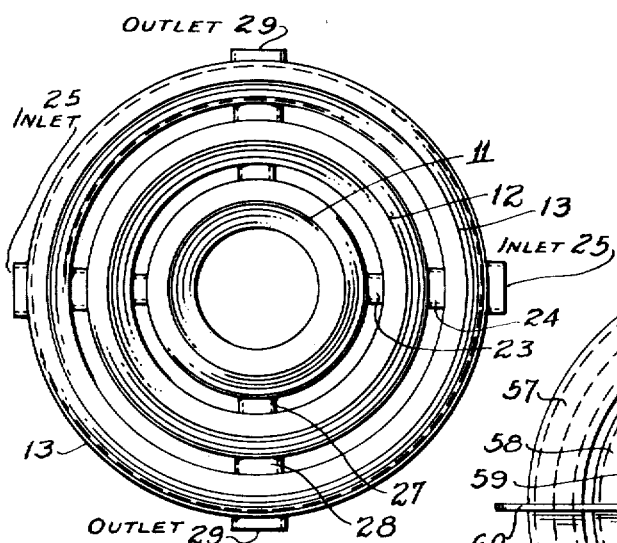
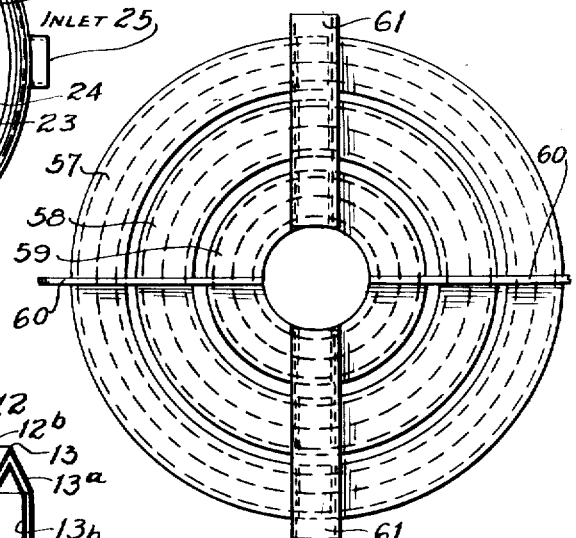
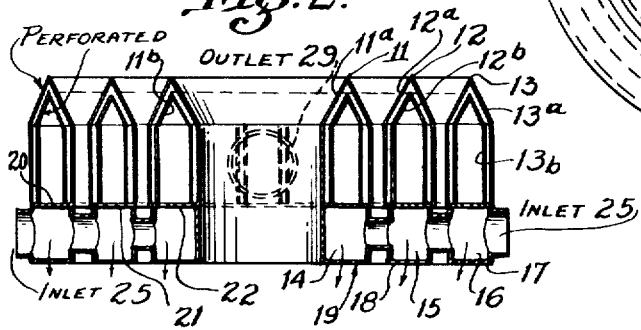
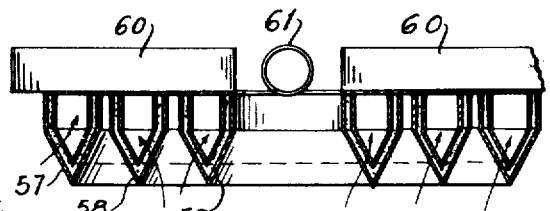
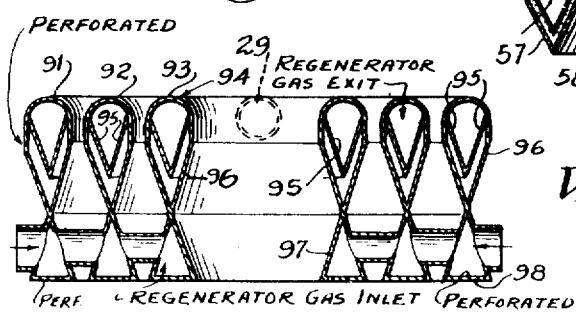
INVENTOR.
Virgil V. Jacomini
BY Philip Subkow
ATTORNEY.

April 27, 1948.   V. V. JACOMINI   2,440,475
PROCESS AND APPARATUS FOR CONTINUOUS CATALYSIS
Filed Jan. 8, 1944   3 Sheets-Sheet 3
*Fig. 7.*
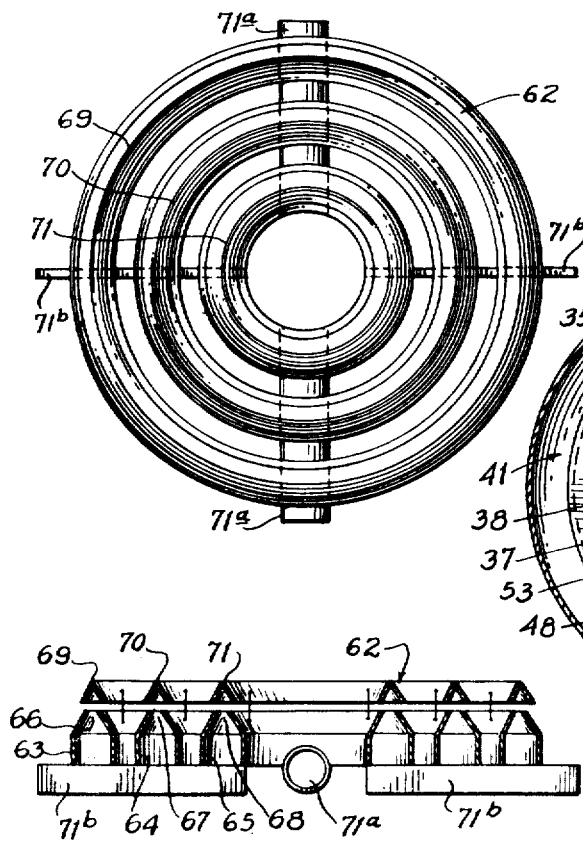
*Fig. 8.*
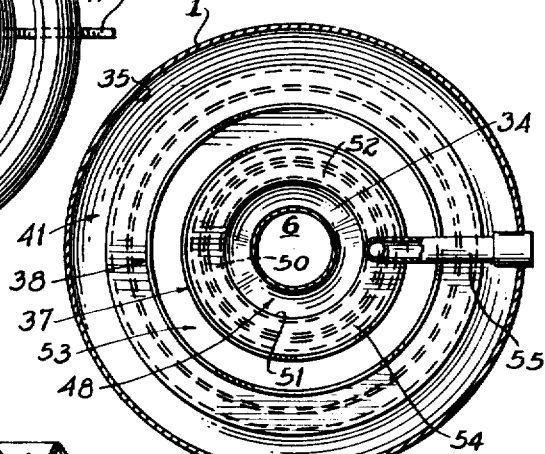
*Fig. 6.*
INVENTOR.
Virgil V. Jacomini
BY
Philip Subkow
ATTORNEY.

Patented Apr. 27, 1948

2,440,475

UNITED STATES PATENT OFFICE 2,440,475

PROCESS AND APPARATUS FOR CONTINUOUS CATALYSIS

Virgil V. Jacomini, Houston, Tex.

Application January 8, 1944, Serial No. 517,595

19 Claims. (Cl. 196—52)

This invention relates to a process in which a reacting vapor is brought in contact with a moving bed of solid particles wherein the particles become contaminated with a combustible material and in which the particles enter a continuous catalytic regeneration step in which the impurities are burned off. As applied to a continuous process of catalysis, this procedure involves primarily the passage of vapors to be converted through a bed of catalyst which progressively moves in and out of the catalytic chamber. The catalytic material, after it is discharged, is continuously introduced into a regeneration unit where the tars and carbon or other poisons and impurities are burnt off while the catalyst moves through the chamber against the movement of the regenerating gases. Provision is made for the withdrawal of the regenerated catalyst and its re-introduction into the catalytic chamber. The velocity of the entering vapors is controlled so that the bed remains stable, that is, it is not suspended in the moving vapors, but rather the vapors move through the body of the catalyst.

The rate of movement of the catalyst through the reaction zone is controlled by the rate of withdrawal of the catalyst from the bottom of the reaction zone. The spent catalyst is continuously purged of any vapors by means of introduced steam or other inert gas.

The catalyst is withdrawn from the reaction zone and conveyed to the regeneration zone by means of a pneumatic conveyor. The catalyst forms a moving body in the regeneration zone in the same manner as in the catalyst zone.

The process of regeneration is a staged regeneration process in that the regeneration proceeds in steps with multiple zones of contact with fresh air introduced in the flue gases. This permits a limitation of the oxygen content of the gases used in each stage, and therefore a control of the rate of combustion and the temperature attained. This is further accomplished by the stage withdrawal of the products of combustion and the return of these products plus fresh air at a lower temperature to further control the temperature rise in the regeneration chamber. The first stage of regeneration is accomplished by the gases used in transporting the catalyst from the reaction zone to the regeneration zone.

The continuous nature of the process permits of the introduction of the catalyst into the regeneration zone at an elevated temperature, thus limiting the amount of air necessary for the regeneration and avoiding large catalyst temperature changes which often injure the catalyst.

The process will be better understood by reference to the drawings, in which

Fig. 2 is a vertical section of one of the distributor heads;

Fig. 3 is a plan view of the distributor head of Fig. 2;

Fig. 4 is a vertical section of another distributor;

Fig. 5 is a flow view of the distributor of Fig. 4;

Fig. 6 is a vertical section of another distributor;

Fig. 7 is a plan view of the distributor of Fig. 6;

Fig. 8 is a section taken along the line 8—8 of Fig. 1; and

Fig. 9 is a vertical section of another form of distributor shown in Figs. 2 and 3.

Figure 1:
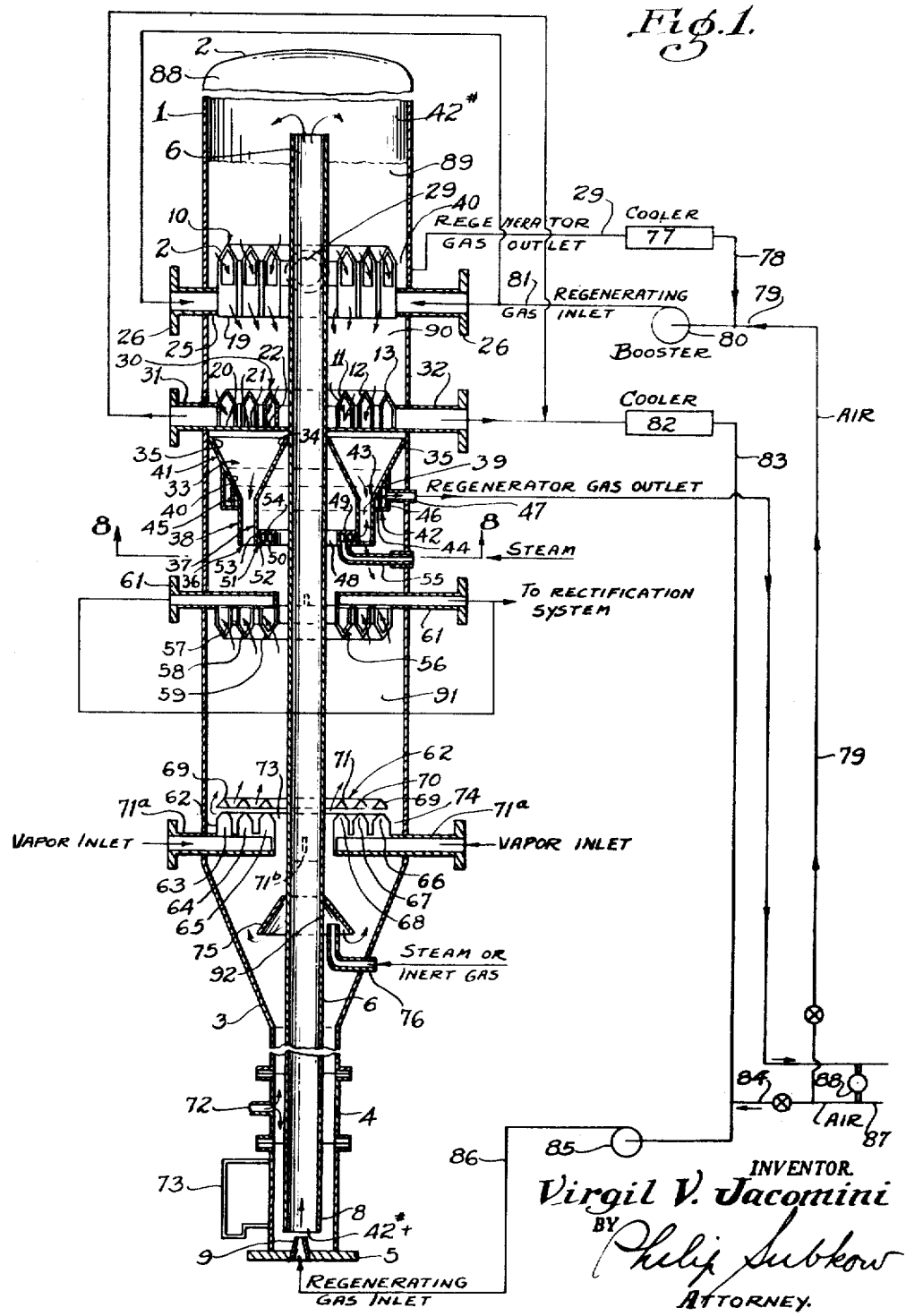
Fig. 1 is a vertical section of the catalyst apparatus showing also schematically a flow diagram to illustrate its application in the catalytic conversion of hydrocarbons.

The construction of the catalyst unit is shown in Fig. 1. It consists of an upright elongated cylindrical vessel 1, closed at the top by a dished head 2, and terminating at the bottom in a cone 3. The bottom of the cone terminates in a pressure leg 4 which is closed by a flanged head 5. Centrally disposed of the chamber is a pneumatic conveyor tube 6. Its upper end 7 is near the top of the chamber 1 and its lower end 8 in proximity to the flanged head 5. A Venturi nozzle 9 is positioned in the flanged head 5. Positioned near the top of the chamber is a gas inlet and outlet distributor 10.

The details of construction of this distributor are shown in Figs. 2 and 3. It will be observed that this distributor is composed of concentric annuli 11, 12, and 13, so mounted as to be concentrically positioned in the chamber. Each annulus is composed of two nesting perforated sections, as, for instance, the annulus 11 has an outer section 11a and an inner section 11b; annulus 12 has an outer section 12a and an inner section 12b; and the annulus 13 has an outer section 13a and an inner section 13b. These nesting annuli are separated from each other to leave a space in which is positioned graded gravel to act as a gravel pack, as will be later explained. The outer annuli 11a, 12a, and 13a depend below the end of the inner annuli 11b, 12b, and 13b to form concentric doughnuts 14, 15, and 16. The bottoms of these doughnuts are closed by concentric perforated rings 17, 18, and 19. These doughnut rings are separated from the concentric annuli 11a and 11b by imperforate rings 20, 21, and 22. The doughnuts 14, 15, and 16 are manifolded by means of manifolding conduits 23 and 24, and the ring 16 has an inlet 25 which extends through the wall of the chamber 1 and ends in the flanged head 26. The interior of the annuli 11b, 12b, and 13b is manifolded by means of connections 27 and 28. The annulus 13b has a gas connection 29.

An alternative form of distributor head from that shown in Figs. 2 and 3 is shown in Fig. 9. In this alternative form, the concentric annuli 91, 92, and 93 are each formed by a circular cap 94 and an internal wedge-shaped perforated annulus 95 and a wedge-shaped perforated annulus 96 spaced from the annulus 95. Positioned beneath the annulus 96 is an imperforate wedge-shaped annulus 97 closed by a perforated ring 98. The inlet 25 is connected to each of the annuli 95 and an outlet 29 is connected to each of the annuli 97. The space between the annuli 95 and 96 is filled with graded gravel as in the case of the annuli shown in Fig. 2.

Positioned below the distributor 10 is a second distributor 30. This distributor is constructed in exactly the same fashion as the upper half of the distributor 10, that is, it does not have the depending doughnuts 14, 15, and 16 shown in distributor 10. These annuli are thus similarly composed of nested annuli 11a, 11b, 12a, 12b, 13a, and 13b separated by a gravel pack, as previously described. The annuli are closed by imperforate rings 20, 21, and 22 and are connected by manifolding 27 and 28 similarly to that described for distributor 10. Gas connections 31 and 32 are provided, which connections extend through the walls of the chamber 1.

Positioned immediately below the distributor 30 is a funnel-shaped annulus 33 which surrounds and makes contact with the pneumatic conveyor tube 6 at its inner periphery 34 and makes contact with the wall of the chamber 1 at its outer periphery 35. A seal is thus made at the wall and at the conduit 6. This annular conical funnel ends in an annular spout 36, the inner wall 37 of the spout being spaced at a substantial distance from the tube 6 and the outer wall 38 of the spout being also spaced a substantial distance from the wall of the chamber 1.

Surrounding the lower portion of the conical annulus 33 and at the upper portion of the annular spout 36 is an annular gas take-off 39. The top of the annulus 39 is formed by the wall portion 40 of the outer wall 41 of the annular spout 33. The top is perforated. The annulus is closed at the bottom by an imperforate ring 42. The inner wall 43 of the annulus 39 is perforated and spaced from the outer wall 38 of the spout 36 and the annulus 39 provided with a second ring 44 to form a narrow hollow chamber 45 in which is positioned a gravel pack. The outer wall 46 of the annulus 39 carries a gas take-off 47 which passes through the wall of the chamber 1.

At the lower end of the annular spout 36 is positioned an annulus 48 which is closed at the top by a ring 49 and at the bottom by a ring 50. The interior wall of the annulus is formed by a wall 51. A perforated ring 52 forms a chamber 53 which is separated a short distance from the interior wall 37 of the spout 36. In the chamber 53 is positioned a gravel pack. The end of the spout 36 which forms the outer wall of the chamber 53 is perforated. The perforated ring 52 separates the gravel pack from the gas chamber 54. The gas chamber 54 is connected to a gas line 55 which passes through the wall of chamber 1.

Below the ring 48 is a vapor take-off 56. The take-off is shown in section in Fig. 4 and in plan view in Fig. 5. The vapor take-off is formed of three concentric annuli 57, 58, and 59 formed in the same way as the annuli of distributor head 30 with gravel pack positioned between the nested annuli. The annuli are held in position by a rod 60 and manifolded by manifolds 61 which pass through the wall of the chamber 1.

Near the bottom of the chamber is a vapor inlet 62, the construction of this inlet being shown in Fig. 6, wherein it is shown in section, and Fig. 7, wherein it is shown in plan view.

The distributor is composed of three annuli 63, 64, and 65 whose bottoms are closed by rings which are provided therefor, and the apices of which are formed as circular nozzles shown at 66, 67, and 68. The nozzles are covered by circular hoods 69, 70, and 71 suitably supported on the annuli 63, 64, and 65. Vapor inlets 71a pass through the chamber 1 and manifold the annuli. These vapor inlets and rods 71b hold the annuli in place.

Immediately below the vapor inlet 62 is a conical umbrella 75 under which is positioned a pipe 76 which passes through the conical wall of the chamber 1. Vapor inlet 71a is connected to a tubular still which acts as a source of oil vapor to be converted. The vapor discharge 61 passes to a system of rectification and vapor treatment.

A steam inlet 72 in the pressure leg 4 is provided. A monometer 73 is provided to show the pressure drop between the vapor inlet 72 and the Venturi throat at 8. The vapor inlet 62 is spaced from the pneumatic conveyor tube 6 and the wall of the chamber 1 so as to provide passages 73 and 74.

The operation of my process in connection with the apparatus hereinabove set out will be described by first setting forth the gas and vapor cycles through the apparatus, and then by describing the catalyst cycle in the apparatus. The chamber is first charged with catalyst of desired quality and size, as will be more fully set out hereinbelow. The charged chamber is closed and vapors of material to be reacted in the reaction zone and regeneration gas are passed to the unit, as will be set out more fully hereinbelow. The chamber is filled through an opening provided therefor to a level somewhat below the top of the head 2. The opening is then sealed. There is thus presented a chamber 88 above the catalyst.

Regenerator gases mixed with air are introduced into the venturi 9 and pass upwardly through the pneumatic conveyor tube 6. The stream of gas, air, and catalyst which moves up the conveyor tube 6 spills over into chamber 88 which is therefore essentially a surge or pressure chamber. The catalyst drops onto the bed of catalyst in the unit. The bed is constantly moving downward, due to the fact that the gas introduced through 9 causes a pneumatic lift of the catalyst and therefore a circulation thereof upward through the tube 6 and downward through the chamber 1. The catalyst which is picked up at the bottom of the pneumatic tube 6 passes down from the catalytic reaction zone 91 where it becomes inefficient because of contamination by tars and coke. In the conveyor tube 6 the air and gas cause some regeneration of the catalyst, causing a rise in temperature in the tube.

The gases and steam discharged into the chamber 88 pass down through the body of catalyst, exiting through the perforations in the outer annuli 11a, 12a, and 13a through the gravel pack and through the perforated inner walls 11b, 12b, and 13b, exiting finally through the gas outlet 29. Provision is then made for cooling the gases in a cooling system 77. Heat may be abstracted from these gases either by heat exchange with oil entering the process or in waste heat boilers, or any other means. The cooled gases are then recirculated through line 78 into which is also introduced air through line 79. The combined air and recirculated gas mixture passes through booster 80 and line 81 to be introduced into the inlet 26. The combined mixture passes into the doughnuts 14, 15, and 16 and passes through the perforated bottoms 17, 18, and 19. The course of the gases is downward through the body of the catalyst and passes between and into the annuli of take-off 30, through the perforated annuli 11a, 12a, and 13a through the gravel pack between the nested annuli to discharge to the gas discharges lines 31 and 32. The gas passes through a gas-cooling or heat-exchange system 82 through line 83 into which is introduced auxiliary air through line 84 and through a blower booster 85 to line 86 into the Venturi nozzle 9.

It will thus be seen that the regenerating gases pass concurrently with the catalyst undergoing regeneration through the several stages of regeneration.

The catalyst, as has been said, in partially regenerated state, is deposited into section 89 and passes downwardly by gravity through and between the annuli of distributor 10. These annuli function as distributors for the redistribution of the catalyst and thus form a new bed of catalyst in chamber 90. In chamber 89 the unconsumed oxygen in the gases introduced with the catalyst through the tube 6 in passing through the body of catalyst further regenerates catalyst, burning off further amounts of the unconsumed carbonaceous material deposited on the catalyst. The gases discharge through the gravel pack and exit through 29, as has been described. In the catalyst regeneration section 90, the recirculated flue gases, together with the fresh air which enters through the doughnuts 14, 15, and 16, pass downwardly through the body of the catalyst and further regenerate the catalyst, so that as the catalyst passes downwardly, gravitationally, through the chamber 90 and in between the annuli of the distributor 30 the catalyst is fully regenerated. The spent gases are withdrawn through 31 and 32.

Steam is introduced into line 55, into the doughnut chamber 53 through the gravel pack in chamber 53, and into the annular spout 36 through the perforated wall 43 of the annular spout, through the gravel pack into chamber 39, and out through the line 47. The excess of flue gases not taken off by line 32, which flue gases pass downward through the annular conical spout 33, also discharge along with the steam through the gravel pack 44 and through the line 47. Some steam in the annular spout 36 will discharge downwardly through the spout along with the catalyst and pass downward into the catalyst chamber.

The regenerated catalyst is directed into and through the distributing hoppers 33 and downward through the spouts 36. Steam through 55, as has been described, is introduced in the spout 36 and this steam strips the gases from the catalyst, passing upwardly through the spouts 36. Any gases present in the catalyst passing down through 33 and 37 also discharge along with the steam into chamber 45 and are removed with the steam through 47.

The catalyst passes downwardly from the end of the annular spout to form a new bed of catalyst in the catalyst chamber 91. As the catalyst passes downwardly through the chamber, it passes between the annuli of the distributing head 56 and is redistributed by this distributor head to form a new bed beneath the distributor head.

Vapors which have been introduced through line 71a exit through the annular nozzle openings 66, 67, 68, and pass underneath the baffles 69, 70, and 71. They pass upwardly through the body of catalyst countercurrent to the descent of the catalyst and through the perforated annuli 57, 58, 59, the gravel pack, and are discharged through the vapor take-off 61 along with the steam.

As the catalyst passes downwardly, gravitationally, through chamber 91, the vapors introduced through 71a pass countercurrent to the descending catalyst. Reaction takes place and vapors are discharged through the gravel packs in annuli 57, 58, and 59, as has been described.

While I have illustrated my process as a countercurrent process, it is also possible to introduce the vapors to be reacted into the inlet 61 and discharge the reacted vapors to suitable fractionating equipment through 71a, thus converting the process of catalysis into a concurrent one.

The catalyst then discharges in between the annuli 63, 64, and 65 and passes down over the umbrella distributor 75. Underneath this umbrella distributor is introduced steam through 76. This steam strips the catalyst of any vapor which it may contain and the stripped catalyst then descends to the pressure leg 4. The steam is introduced into the pressure leg through 72. This pressure leg is so designed in length that the resistance to flow will permit the steam entering at 72 to build up a pressure at the entrance of 72 which will be higher than the pressure existing either at the top of the leg 4 or at the bottom of the leg 4 near the venturi. Steam therefore passes in both directions, part passing upwardly and part passing downwardly through the annular space between the leg 4 and the conduit 6.

This creates a second steam seal, preventing any passage of vapors from the reaction zone 91 downwardly with the stripped catalyst and thus seals the bottom of the reaction zone from the regeneration zone 89 without the use of a valve.

The catalyst gravitates down through the catalyst chamber, over the umbrella 75 and downward into the pressure leg 4. The air streams 79 and 84 are fed through a common line 87. The rate of feed of air is conditioned by the amount of burning necessary for regeneration, and therefore is dependent upon the catalytic process which is carried out. The rate of discharge of excess flue gases in line 47 is controlled so that it is in a fixed volumetric ratio to rate of feed of air. This is accomplished by means of the flow regulator 88. With the operation in equilibrium the gas temperature in line 47 will be substantially constant. At such constant temperature the rate of discharge of gas 47 is held to a fixed volumetric ratio to air fed at a constant pressure and temperature. Where a flue gas and air mixture is employed as the source of fresh oxygen, the oxygen concentration should also be kept constant. The essential control is that the rate of withdrawal of the gas be such that the steam is always present in the withdrawn gas, insuring that the steam introduced through 55 passes upwardly through the spout 37. It is preferable for this purpose that the steam supply remain at a substantially constant pressure.

It will be observed that the flue gas recirculation through line 86, conduit 6, line 28, line 26, line 81, and back through the conduit 6, moves in a closed cycle. The additional volume of gases resulting from the introduction of air into this flow cycle through 19 and 84, plus the amplification in volume resulting from the combustion and from the introduced steam, is removed through 47.

The steam introduced through 55 has a twofold function. It strips the residual gases from the regenerated catalyst so as to insure that the gases do not pass down into the catalyst reaction zone. The steam or gas therefore acts as a steam seal which separates the regeneration chamber from the catalyst zone, and the separation of the regeneration zone from the catalyst zone is accomplished without the use of a valve. As has been said previously, the control of the withdrawal of gases from 47 is such as to insure the presence of steam in these gases, thus making sure the steam passes upwardly through the spouts 37 to both strip the catalyst of the residual gases and seal the regeneration chamber from the catalyst chamber. By controlling the rate of withdrawal of the gases from 47 in ratio to the feed of air through 87, the proper pressure differentials are set up to insure the direction of flow of gases as has been here described.

The flue gases employed in the regeneration zone move in a closed cycle, the flow being upward through the pneumatic conveyor conduit and out through the first distributor head, through a cooler and back with fresh air into the distributor head below the first gas withdrawal point, and then from a lower point in the catalyst body back to the pneumatic conveyor. Air is fed into this cycle and excess gases withdrawn from the cycle. By the volumetric proportioning of the flow of these discharging gases to the air introduced into the system, the movement of gases through the system is controlled. The catalyst, as it passes from the regeneration zone, is continuously purged of excess flue gases and air, so that the catalyst entering the reaction is stripped of the gases. The regenerated catalyst passes through a pressure seal formed by the purging steam which is introduced into the distributor spout. This steam creates a zone of high pressure in this spout, thus preventing the passage of gases with the catalyst which descends through the pressure zone. By controlling the steam entrance so that steam discharges along with the stripped gases, this control is assured. This is further assured by the volumetric control previously referred to.

The apparatus thus permits of carrying out the process of regeneration of the catalyst by stages. The first stage occurs in the pneumatic conveyor 6. This may be but of a minor but may also be of a major degree of regeneration, depending on the time of contact in the conveyor. The regeneration also occurs in the bed 89 where additional contact time between the air introduced with the gases into the tube 6 is provided. The partially regenerated catalyst passes down into bed 90 and the spent gases are withdrawn through line 29.

Relatively cool gases containing a fresh charge of oxygen are introduced through line 81 and inlet 86 and a new stage of regeneration is established in bed 90. Spent gases are withdrawn from exit 32 into cooler 82 to be recycled to the venturi 8.

While the process steps are shown as consisting of two regeneration beds 89 and 90, additional beds may be established by introducing additional distributor heads, such as 10, between the head 10 and the head 55 Figs. 4 and 5, thus increasing the number of stages of regeneration and further limiting the extent of regeneration in each stage.

By dividing the regeneration into a plurality of stages, I limit the temperature rise in each stage, since I limit the amount of carbon burned off in each stage. Additionally, by withdrawing the hot products of combustion between each stage and introducing relatively cool gases containing oxygen to support the combustion in the next succeeding stage, I again limit the extent of the temperature rise which occurs in each stage. I am also enabled to limit the oxygen concentration in the gases entering each regeneration stage to that required to support the desired degree of combustion in such stage.

As a result of this feature of my regeneration process, I am enabled to control the temperature and rate of combustion in each zone and to prevent exposure of the catalyst to excessive temperatures which may be harmful to the activity of the catalyst.

As is well known, the rate of combustion of the carbon in regeneration of the catalyst drops off as the catalyst approaches the last stages of regeneration. This rate is accelerated by increasing the temperature of the catalyst as it approaches its later stages of regeneration. This may be accomplished in my process by controlling the temperature and oxygen concentration of the gases recirculated to the last stages of the regeneration. Of course, care must be taken to avoid excessive temperatures which will impair the activity of the catalyst.

The sealing of the catalyst chamber is formed by a steam seal in a pressure leg through which the catalyst discharges. By introducing the steam at an intermediate point in the pressure leg, and by the design of this leg, a zone of high pressure is maintained in the leg higher than occurs either at the entrance of the leg or at its bottom where it connects to the pneumatic conduit. This seal therefore seals the exit of the catalyst chamber from the regeneration zone.

The catalyst is transported to the regeneration chamber by pneumatic conveyor in which the gases used for regeneration are employed for the motive power.

The transportation tube 6 is positioned axially of the chamber and acts to some degree both as a zone of regeneration and perhaps also as a heat-imparting medium to the reaction zone.

While this is a preferred construction, the tube 6 may be positioned outside the unit and be connected to the leg 4, the jet 9 being in the end of the tube 6 and the tube 6 discharging into the top of the chamber 88. This construction also permits of the placing of a valve in the bottom of the leg 4 between the leg and the pneumatic conduit to act as an additional seal and means for controlling the rate of discharge of catalyst from the reaction zone to the pneumatic conveyor conduit 6 and thence to the regeneration zone. This control gives additional control of the rate of movement of the catalyst through the reaction chamber and thus permits of an additional variation of the ratio of catalyst to vapor volume per unit of time.

The catalyst moves in a closed cycle and is therefore exposed only to the regeneration air, thus avoiding any deterioration of the catalyst.

The rate of flow of catalyst through the regeneration chamber and the catalyst chamber is controlled by the rate of withdrawal of catalyst from the bottom of the catalyst chamber by controlling the rate of flow of regenerating gas.

The provision of the distributor heads, both in the regenerating zone and in the catalyst zone, permits of a redistribution of the catalyst periodically as it passes through the zones. This redistribution of catalyst aids to prevent channeling of the vapors and insures a more uniform distribution of vapors throughout the chamber. The uniform distribution of the gases and vapors through the body of catalyst is made possible by the use of the annuli which form multiple zones of discharge and entrance across the body of the catalyst.

The distributor heads are buried within the body of the catalyst and the vapors are not therefore withdrawn from a surface of a catalyst bed, but rather from the interior of the bed itself. This avoids the channeling of the bed resulting from the uneven discharge of gases from a surface of the bed.

The provision of gravel packs at the point of inlet or outlet of gases prevents the passage of fine particles of catalyst ground off from the larger granules along with the gases and thus prevents the clogging of the vapor passages or the deposit of these particles in the vapor lines or rectification system. The gravel packs act to filter out these fine particles. The continual passage of the granules of catalyst past the filtering surfaces cleans these surfaces of the deposited catalyst fines.

The continuous feed of catalyst at a temperature in excess of the exit temperature of the vapors leaving the catalyst in material part supplies the endothermic heat of conversion and aids to maintain the catalyst body at the desired elevated temperature.

The use of a single container in which there are zones of regeneration and reaction with means for gas distribution and catalyst passage also provides for heat economy, limitation of temperature range in the catalyst, and also permits of a high degree of simplicity, economy of construction, and operation.

Instead of using steam as a seal or purge, I may use any inert gas such as flue gas, $CO_2$, $N_2$, or other gases which will not react with the material undergoing catalysis or impair the catalytic reaction or the regeneration cycle. I prefer to employ steam, since the steam is condensible and will not increase the volume of gases which must be handled in the rectification and absorption systems. However, with some catalysts which are sensitive to steam, inert gas may be employed.

I preferably employ catalyst of uniform particle size or of such particle size distribution as to obtain a highly permeable bed. For instance, I may use a granular material of from 6 to 16 mesh or in molded pellet form. For example, I may employ catalyst pellets of from $\frac{1}{16}$ to 1 inch in diameter and from $\frac{1}{16}$ to 1 inch in length, preferring to employ a pellet whose length equals its diameter. I may employ the catalyst formed in bead form or in any other shape of suitable dimensions.

The catalyst should be of such size and shape as to pass freely between the annuli and be pneumatically transportable through the conduit 6. It should be of such size and shape as to give a maximum weight of catalyst in the chamber with a suitable porosity for free flow of gases so as to maintain desired space velocity through the catalyst without excessive velocity through the bed or without too low a velocity therethrough.

The density of the catalyst and its size are determined, of course, in part by consideration of the catalyst activity, but also to obtain a bed of uniform porosity and to enable the maintenance of stable bed conditions in the regenerator and reaction chambers.

The catalyst which I may employ will depend, of course, on the nature of the catalytic reaction which I wish to perform. For example, in the catalytic conversion of hydrocarbons such as in the cracking or refining of oil, the catalyst may be a silica gel or a silica alumina gel catalyst formed by the co-precipitation of $SiO_2$ and $Al_2O_3$ or by the precipitation of hydrated alumina on silica gel. This catalyst is well known as a cracking catalyst. The purified gel may then be ground to proper particle size for the above use. I may use an acid activated montmorillonite clay catalyst, either in granular form or in pellet form as set out above.

The process and apparatus may be employed in various catalytic operations. The apparatus may be designed to operate at pressures from atmospheric to 3000 pounds per square inch or higher and at temperatures conditioned only on metallurgical and design factors. Certainly as high as 1000 to 1200° F. The vapors or gases to be catalytically reacted or converted are introduced via 71a and discharged via 61. Thus, for example, the process may be used in the cracking of hydrocarbons, in which case a heavy gas oil or light gas oil or naphtha vapors heated to the desired temperature may be fed to the system. For gas oil cracking or reforming operations, the temperature may vary from 850 to 1050° F.

In employing the process in isomerization operations, the paraffinic or olefinic hydrocarbon, such as butane, butene, pentane, pentene, hexane or hexene, or other straight chain aliphatic or olefinic hydrocarbon may be charged to the unit and isoparaffinic or iso-olefinic hydrocarbons discharged from the unit. Zinc chloride, aluminum chloride catalysts which have been found useful in isomerization of straight chain saturated hydrocarbons, and others which may include molybdenum sulfide, copper sulfide, nickel on alumina, nickel on zinc oxide. The temperatures employed may range from 450° to 850° F.

Catalysts found useful for isomerization of olefins and which may be employed in my process include diatomaceous earth impregnated with phosphoric acid, alumina, aluminum sulfate, molybdenum sulfide, and activated clay. Temperatures ranging from 600° to 1050° F. may be employed, depending on the catalyst and the hydrocarbon.

Aliphatic hydrocarbons may be dehydrogenated in my process. Catalyst found useful in the dehydrogenation of hydrocarbons and which may be employed in my process include oxides of molybdenum, zinc and magnesium, chromic oxide gel, chromic oxide on silica gel, activated alumina, alone or mixed with promoters such as oxides of chromium or iron vanadium or titanium.

Naphthenes may be dehydrogenated. Catalysts found useful in such dehydrogenation and which may be employed in my process include palladium, platinum, nickel deposited on carriers such as clay, diatomaceous earth or alumina, at temperatures of about 500 to 600° F. Such catalysts are easily poisoned by sulfur, and non-sulfur bearing naphthenes are to be preferred. Other catalysts may be employed but require higher temperatures, for instance, clay, silica gel, oxides of chromium, tungsten, or molybdenum. These types of catalyst are not readily poisoned by sulfur compounds and stocks containing sulfur impurities may be employed.

Depending on the temperature and pressure employed and the partial pressure of hydrogen in the mixture of the hydrocarbons and hydrogen fed to the unit through 63, hydrocarbons may be converted into high-octane gasoline, or can be converted with hydrogenation, i. e., increase in the hydrogen content of the product due to addition of hydrogen or with no net consumption of hydrogen, but with low carbon deposit on the catalyst.

My process is particularly well adapted to the carrying out of such catalystic reactions. The oxides and sulfides of molybdenum, tungsten, chromium, vanadium, tin, zinc, iron, cobalt, or nickel alone or supported on clay, silica gel, alumina and magnesium oxides may be employed as catalysts in carrying out such operations according to my process and in my apparatus. For destructive hydrogenation in which hydrogenation is accompanied by cracking operation the temperatures may run from 750° to 1050° F. Pressures may be from atmospheric up to 200 atmospheres. Relatively high pressure of 1000 to 3000 pounds are to be preferred.

Non-destructive hydrogenation in which a minimum amount of cracking occurs is performed usually at temperatures below about 650 to 700° F., depending on the reaction time in the catalytic reaction.

When employing pressures as low as atmosphere to 500 pounds, cracking and dehydrogenation occur and the balance of hydrogenation and dehydrogenation may occur with no net consumption of hydrogen. Such processes are exemplified by the dehydrogenation of naphthenes to form aromatics.

Olefins may be polymerized in my process by passing olefins through the reaction zone. Catalysts useful for olefin polymerization and which may be employed in my process are phosphoric acid deposited on carriers such as diatomaceous earth or clay, zinc chloride, clay.

While the apparatus and process of my invention have been described as applying to catalytic process employing solids having high catalytic activity, the process also has more general applicability to any process in which a reacting gas is in contact with a hot solid, in which process the solid becomes inactivated and may be subsequently reactivated in a regeneration stage by means of a gas.

Thus, the process is applicable to a procedure in which the solid particle is composed of low and perhaps even catalytically inert material. In such case the solid may be merely a heat carrier. One application of this process is in the thermal processing of hydrocarbon vapors. The heated vapors are passed through the bed of hot particles in bed 91 and in becoming converted deposit carbon and tars on the particles. The particles are thus cooled by heat losses in the reaction zone. This coke and tar is burned off in the regeneration zones 89 and 90 and the particles are reheated to the desired high temperature. Thus, endothermic heat of reaction or other heat losses due to conduction or convection or arising from any superheat imparted to the reacting vapors by the relatively hotter particles is supplied by the combustion of the carbon or tar in the regenerator section.

Thus hydrocarbon vapors such as gas oil vapors, naphthas, gasoline may be thermally cracked or reformed. Lighter fractions such as pentanes, butanes, propanes, ethane or their corresponding olefins may be thermally converted.

For example, $C_5$ and lighter paraffins, saturated and unsaturated hydrocarbons may be either thermally cracked or polymerized, isomerized or alkylated under thermal conditions now well established for such reaction by employing my process and apparatus.

One useful application is in the cracking of natural gas to produce $H_2$ for the hydrogenation operations such as destructive and non-destructive hydrogenation, hydroforming or for a Fischer-Tropsch synthesis. In such a procedure natural gas or light gases such as the $C_4$ and lighter hydrocarbons are passed through the reaction zone into which the hot particles pass at a temperature ranging from 1000 to 1250° F. for ordinary commercial steel vessels or up to 1500° F., depending on the use of special steels or refractory lined chambers. By this procedure the gases may be converted into useful gasoline and a hydrocarbon gas rich in hydrogen.

The process is also useful in carrying out the catalytic conversion of hydrocarbons into hydrogen. In such case the reaction vessel is fed by a mixture of hydrocarbons and steam to produce CO and hydrogen, and the catalyst is a nickel or cobalt catalyst well known for such purposes. In applying this procedure to my process, in like manner it may also be employed for converting the CO from the above procedure by passing the effluent gases, mixed with steam through the reaction zone of another similar unit, over an iron oxide catalyst moving as a bed through said zone, well known to catalyze this reaction.

It will thus be seen that my process is adaptable to a wide variety of hydrocarbon conversion processes. In all of said processes the hydrocarbons to be converted are passed through the reaction zone countercurrent to the descending bed of catalyst. The catalyst is in the form of solid particles of such size and stability that it will descend as a body of granular particles. The reaction is carried out at an elevated temperature. The spent catalyst is withdrawn from the bottom of the reactor and elevated by a stream of regenerating gas to the regenerator unit wherein it is regenerated and returned to the reaction chamber.

As previously indicated in the process for hydrocarbon conversion the reaction may vary from 700 to about 1050° F., and pressures from atmospheric to 200 atmosphere and higher.

Provision may be made for reducing the temperature of the catalyst as it passes from the regeneration zone to the reaction zone in such cases where the catalytic reaction is to occur at temperatures materially below that attained in the regeneration zone. The steam injected via 55 will in part act to cool the catalyst, itself becoming superheated. Additional cooling means may be provided. If water instead of steam is passed through 55, the evaporation of the water to steam and its superheat will act as cooling means.

A cooling gas cycle may be introduced between the distributor 32 and the funnel 35 to cool the catalyst to the desired temperature before introduction into the funnel. Such a cycle could pass the gas from 83 instead of into 9, into a distributor such as 2 positioned below 30 and above 35. The recirculated gases then could discharge via 44.

The following example of the application of the process to the conversion of hydrocarbon may be taken as illustrating one specific application of the process to illustrate and further explain the operation thereof.

Naphtha vapors are generated in a tubular still, not shown, where they are superheated to a temperature of about 900° F. to 925° F. In passing through the reaction zone, due to the endothermic heat of cracking and reforming reaction, perhaps also due to some radiation losses, the temperature of the vapors drops from the temperature of 900° F. to 925° F. to a temperature of about 850° F. at the point of discharge at the distributor 56. The temperature in the catalyst bed therefore, at this point of discharge, is about 850° F. As will be later explained, the catalyst immediately above the reaction zone at the point where it enters therein is about 1000° F. The heat which is dissipated in the reaction zone by radiation loss and by endothermic heat of cracking is made up in part by the drop in vapor temperature of from 900° F. or 925° F. to 850° F. and of catalyst temperature. This accounts for about ¾ to ⅔ of such heat loss. The remaining ¼ to ⅓ of this heat load comes from the catalyst in dropping from 1000° to about 850° F.

The pressure in the reaction zone at the point of discharge of the vapors into the zone 91 is about 40 pounds. The discharge pressure of the vapors through line 61 is 38 pounds. The pressure, therefore, in the reaction zone at the point of discharge of the vapors from the reaction zone into the conduit 61 is about 38 pounds. This represents a two-pound drop in pressure through the catalyst bed. The catalyst, in passing out of the reaction zone, is, as stated, stripped by the steam entering through 76. The pressure in the chamber under the umbrella 75 is about 40 pounds plus, and there is, therefore, a pressure differential which permits steam to move upwardly into the catalyst zone.

The pressure which is maintained at the bottom of the conduit 6 immediately above the nozzle 9 is about 42 pounds plus. The steam is introduced through 72 to maintain the pressure of about 43 pounds at the point of entry. It will be observed that this pressure is higher than the pressure existing underneath the umbrella and higher than the pressure existing at the entrance of the reaction zone, and higher than the pressure existing at the bottom of the pneumatic conduit. It will also be observed that the pressure at the bottom of this conduit is higher than exists at the entrance of the reaction zone and, therefore, the major portion of the steam introduced through 72 will pass upwardly through the cone 3 and into the reaction zone.

As a consequence of these pressures, the stripping steam introduced via 76 will pass upwardly into the reaction zone, and in so doing will act to strip the catalyst of hydrocarbon vapors. Steam introduced via 72 will act as a steam seal and prevent the downward discharge of the hydrocarbon vapors and thus will prevent them from entering the tube 6. The steam will pass upwardly into the reaction zone. The effect of this pressure control is to effectively separate the reaction zone from the conduit 6 by means of a steam seal.

The temperature at the bottom of the conduit is about 900° F. The rate of introduction of gases through the venturi 9 is conditioned by the rate at which the catalyst is to be moved through the chamber 1 and this constitutes a control of the rate of movement of the catalyst. Enough gases are introduced through the venturi 9 so that the desired lift of catalyst is obtained. Some reaction occurs in the conduit 6 so that partial regeneration is obtained. The heat of reaction causes some reheating of the catalyst bed. The pressure which exists in the chamber 88 is, of course, lower than the pressure at the bottom of the tube 6 in an amount equal to the friction head which is lost in the conduit 6. The pressure in chamber 88 is about 42 pounds. The rate of introduction of air and gas through venturi 9 and through the distributor head 10 and through the distributor doughnuts 14, 15, and 16 is controlled for the desired reaction as previously described. The composition of the regeneration gases is such as to contain about 3% to 5% of free oxygen. The gases discharged through the head 10 into conduit 29 are at about 1000° F., resulting from the combustion of the carbonaceous material on the catalyst in the conduit 6 and in the bed 89. The gases withdrawn through 29 are cooled and recirculated through 26 and this stage of recirculation cools the catalyst down to about 900° F. as it enters the bed 90. In passing down through the bed 90, the remaining unconsumed carbonaceous material is burnt off, thus raising the temperature of the gases and the catalyst to about 1000° F. The gases withdrawn through 32 are cooled in cooler 82 and by commingling with cool air through 87, so as to maintain a temperature of around 900° F. in the bottom of the conduit 6.

The catalyst descends through the hoppers 35 and descends downwardly through the annular spout 36. Steam is introduced in such volume and in such amount to discharge in large part through outlet 46, as described above, the residual steam entering the reaction chamber. The steam thus acts to purge the catalyst of combustion gases and acts also to cause a steam seal, preventing the passage of gases from the regeneration chamber into the reaction chamber or from the reaction chamber into the regeneration zone.

The catalyst then enters the reaction chamber at this temperature of about 1000° F. and it drops in temperature due to the cooling effect of the gases to somewhat higher than 850° F. The catalyst bed is at all times at somewhat higher temperature than the gases. There is, therefore, an abstraction of heat on this catalyst bed by the gases and the reaction. The temperature of the catalyst drops from about 1000° F. to some temperature higher than 900° F. in passing into and through the reaction zone.

It is to be understood that the specific pressure and temperature flow rates given above are merely to illustrate and explain the operation and are not intended to be any limitation on my invention.

While I have described a particular embodiment of my invention for the purpose of illustration, it should be understood that various modifications and adaptations thereof may be made within the spirit of the invention as set forth in the appended claims.

I claim:

1. A vapor and solid contact apparatus of the class described, comprising a reaction chamber for contact of vapors and gases at high temperature, an inlet for hot solids into the chamber, an outlet for solids from said chamber, a vapor inlet into said reaction chamber, a vapor outlet from said chamber, a regeneration chamber, a solids inlet to said regeneration chamber and a solids outlet in said regeneration chamber, means connected to the outlet from said reaction chamber for pneumatically conveying solids directly to said regeneration chamber, means for gravitationally conveying hot solids from said solids outlet of said regeneration chamber to said reaction chamber, means for introducing regenerating gas into one end of said regeneration chamber, means for passing regenerating gases through the regeneration chamber together with said solids means for removing regenerating gas from an intermediate zone of said regeneration chamber, means for introducing fresh regenerating gas into an intermediate zone of said regeneration chamber, and means for withdrawing regenerator gas from another end of said regeneration chamber, said means for introducing regenerating gases and withdrawing gases from said regeneration chamber being adapted for the passage of solids from the solids inlet of said regeneration chamber to the solids outlet of said regeneration chamber.

2. A vapor and solid contact apparatus of the class described, which comprises a vessel adapted to receive and contain a moving bed of solids, means dividing the vessel into compartments, one of which constitutes a reaction compartment and the other a regenerating compartment, a solids passageway from one end of the regenerating compartment to one end of said reaction compartment, a solids outlet from said reaction compartment and positioned within said reaction compartment, a pneumatic conveyor conduit positioned in said vessel connected to said solids outlet from said reaction compartment and discharging into said regenerating compartment, a vapor inlet to said reaction compartment, a vapor outlet from said reaction compartment, means for introducing regeneration gases into said conduit to pneumatically convey the solids from said reaction compartment into said regenerating compartment, means for withdrawing gases from said regenerating compartment at an intermediate point in said regenerating compartment, means for introducing fresh regenerating gases into an intermediate point in said regenerating compartment, and additional means for withdrawing gases from the regenerating compartment, said means for introducing regenerating gases and withdrawing gases from said regeneration zone being adapted for the passage of solids from the solids inlet of said regeneration zone to the solids outlet of said regeneration zone.

3. A vapor and solid contact apparatus of the class described, which comprises a vessel adapted to receive and contain a moving bed of solids, means dividing the vessel into compartments, one of which constitutes a reaction compartment and the other a regenerating compartment, a solids passageway from one end of the regenerating compartment to one end of said reaction compartment, a solids outlet from said reaction compartment, a pneumatic conveyor conduit positioned in said vessel connected to said solids outlet from said reaction compartment and discharging into said regenerating compartment, a vapor inlet to said reaction compartment, a vapor outlet from said reaction compartment, means for introducing regeneration gases into said conduit to pneumatically convey the solids from said reaction compartment to said regenerating compartment, means for withdrawing gases from said regenerating compartment at an intermediate point in said regenerating compartment, means for introducing fresh regenerating gases into an intermediate point in said regenerating compartment, additional means for withdrawing gases from the regenerating compartment, means for introducing a sealing reacting gas into said communicating means between said reaction compartment and said regenerating compartment to prevent regeneration gases from passing from the regenerating compartment to the reaction compartment, and means for introducing a sealing gas into said solids outlet from said reaction compartment to prevent gases or vapors from said reaction compartment entering said pneumatic conveyor.

4. A process for hydrocarbon conversion, which comprises introducing hydrocarbons at an elevated temperature into one end of a gravitationally descending body of hot catalyst in a catalytic reaction zone, withdrawing converted vapors from another end of said reaction zone, discharging spent catalyst carrying carbonaceous material from said reaction zone and pneumatically conveying said catalyst into a regenerating zone wherein said catalyst gravitationally descends as a body to be regenerated by oxygen containing gas introduced into said regenerating zone and which oxygen containing gas passes together with the gravitationally descending body of catalyst through the regenerating zone, withdrawing combustion gases from said regenerating zone, and passing regenerated catalyst gravitationally from said regenerating zone into said reaction zone.

5. A process for hydrocarbon conversion, which comprises introducing hydrocarbons at an elevated temperature into one end of a gravitationally descending bed of catalyst to pass countercurrent to said catalyst in a catalytic reaction zone, removing converted vapor from the other end of said catalyst bed in said zone, removing spent catalyst carrying carbonaceous impurities from contact with said vapors in said reaction zone, removing converted vapor from the other by means of an oxygen containing gas into the upper portion of a regeneration zone, establishing a gravitationally descending bed of catalyst in said regeneration zone and passing said gas concurrently with said catalyst through an upper portion of said bed in said regeneration zone, causing combustion to occur in said portion of said bed, withdrawing the combustion gases from an intermediate zone of said bed in said regeneration zone, introducing gases containing oxygen into an intermediate portion of said bed in said regeneration zone to pass concurrently with said gravitationally descending bed of catalyst in a lower portion of said regeneration zone, withdrawing an additional stream of combustion gases from the lower portion of said bed in said regeneration zone, removing regenerated catalyst from said regeneration zone, and introducing said catalyst into said catalyst reaction zone.

6. A process for hydrocarbon conversion, which comprises introducing hydrocarbons at an elevated temperature into one end of a gravitationally descending bed of catalyst to pass countercurrent to said catalyst in a catalytic reaction zone, removing converted vapor from the other end of said catalyst bed in said zone, removing spent catalyst carrying carbonaceous impurities from contact with said vapors in said reaction zone and pneumatically conveying said catalyst by means of an oxygen containing gas into the upper portion of a regeneration zone, establishing a gravitationally descending bed of catalyst in said regeneration zone and passing said gas concurrently with said catalyst through an upper portion of said bed in said regeneration zone, causing combustion to occur in said portion of said bed, withdrawing the combustion gases from an intermediate zone of said bed in said regeneration zone, cooling said combustion gases, adding fresh oxygen containing gases to said combustion gases and re-introducing said gases into an intermediate portion of said bed in said regeneration zone to pass concurrently with said gravitationally descending bed of catalyst in a lower portion of said regeneration zone, withdrawing an additional stream of combustion gases from the lower portion of said bed in said regeneration zone, cooling said last-named combustion gases, adding additional oxygen containing gases to said last-named withdrawn combustion gases and introducing such gases into said pneumatic conveying means to pneumatically convey the spent catalyst from said reaction zone to said regeneration zone, removing combustion gases from a lower point in said gravitationally descending bed of regenerated catalyst, removing regenerated catalyst from said regeneration zone, and introducing said catalyst into said catalyst reaction zone.

7. A process for hydrocarbon conversion, which comprises introducing hydrocarbons at an elevated temperature into one end of a gravitationally descending bed of catalyst to pass countercurrent to said catalyst in a catalytic reaction zone, removing converted vapor from the other end of said catalyst bed in said zone, removing spent catalyst carrying carbonaceous impurities from contact with said vapors in said reaction zone and pneumatically conveying said catalyst by means of an oxygen containing gas into the upper portion of a regeneration zone, establishing a gravitationally descending bed of catalyst in said regeneration zone and passing said gas concurrently with said catalyst through an upper portion of said bed in said regeneration zone, causing combustion to occur in said portion of said bed, withdrawing the combustion gases from an intermediate zone of said bed in said regeneration zone, cooling said combustion gases, adding fresh oxygen containing gases to said combustion gases and re-introducing said gases into an intermediate portion of said bed in said regeneration zone to pass concurrently with said gravitationally descending bed of catalyst in a lower portion of said regeneration zone, withdrawing an additional stream of combustion gases from the lower portion of said bed in said regeneration zone, cooling said last-named combustion gases, adding additional oxygen containing gases to said last-named withdrawn combustion gases and introducing such gases into said pneumatic conveying means to pneumatically convey the spent catalyst from said reaction zone to said regeneration zone, maintaining the oxygen containing gas fed to the unit at a constant temperature and pressure and maintaining constant the ratio of the volume of the last-named combustion gases withdrawn from the system to the ratio of fresh oxygen containing gas fed to the system, removing combustion gases from a lower point in said gravitationally descending bed of regenerated catalyst, removing regenerated catalyst from said regeneration zone, and introducing said catalyst into said catalyst reaction zone.

8. A continuous process for hydrocarbon conversion, which comprises introducing hydrocarbons at an elevated temperature into one end of a gravitationally descending bed of catalyst to pass countercurrent to said catalyst in a catalysis zone, removing converted vapor from the other end of said catalyst bed, removing spent catalyst carrying carbonaceous impurities from contact with said vapors and pneumatically conveying said catalyst by means of an oxygen containing gas into the upper portion of a regeneration zone, establishing a gravitationally descending bed of catalyst in said regeneration zone and passing said gas concurrently with said catalyst through the said regeneration zone to cause combustion of said impurities, removing combustion gases from the other end of said zone, removing regenerated catalyst from said other end of said regeneration zone, introducing a stripping gas into contact with said regenerated catalyst prior to introduction into said catalysis zone, discharging said stripping gas into said regenerator zone to be withdrawn with said combustion gases, and introducing said catalyst into the catalysis zone.

9. A process for hydrocarbon conversion, which comprises introducing hydrocarbons at an elevated temperature into one end of a gravitationally descending bed of catalyst to pass countercurrent to said catalyst in a catalytic reaction zone, removing converted vapor from the other end of said catalyst bed in said zone, removing spent catalyst carrying carbonaceous impurities from contact with said vapors in said reaction zone and pneumatically conveying said catalyst by means of an oxygen containing gas into the upper portion of a regeneration zone, establishing a gravitationally descending bed of catalyst in said regeneration zone and passing said gas concurrently with said catalyst through an upper portion of said bed in said regeneration zone, causing combustion to occur in said portion of said bed, withdrawing the combustion gases from an intermediate zone of said bed in said regeneration zone, introducing gases containing oxygen into an intermediate portion of said bed in said regeneration zone to pass concurrently with said gravitationally descending bed of catalyst in a lower portion of said regeneration zone, withdrawing an additional stream of combustion gases from the lower portion of said bed in said regeneration zone, introducing a stripping gas to strip said regenerated catalyst, discharging said stripping gas into the regeneration zone to be withdrawn therefrom together with the last-named combustion gases, removing regenerated catalyst from said regeneration zone, and introducing said catalyst into said catalyst reaction zone.

10. A process for hydrocarbon conversion, which comprises introducing hydrocarbons at an elevated temperature into one end of a gravitationally descending bed of catalyst to pass countercurrent to said catalyst in a catalytic reaction zone, removing converted vapor from the other end of said catalyst bed in said zone, removing spent catalyst carrying carbonaceous impurities from contact with said vapors in said reaction zone and pneumatically conveying said catalyst by means of an oxygen containing gas into the upper portion of a regeneration zone, establishing a gravitationally descending bed of catalyst in said regeneration zone and passing said gas concurrently with said catalyst through an upper portion of said bed in said regeneration zone, causing combustion to occur in said portion of said bed, withdrawing the combustion gases from an intermediate zone of said bed in said regeneration zone, cooling said combustion gases, adding fresh oxygen containing gases to said combustion gases and re-introducing said gases into an intermediate portion of said bed in said regeneration zone to pass concurrently with said gravitationally descending bed of catalyst in a lower portion of said regeneration zone, withdrawing an additional stream of combustion gases from the lower portion of said bed in said regeneration zone, cooling said last-named combustion gases, adding additional oxygen containing gases to said last-named withdrawn combustion gases and introducing such gases into said pneumatic conveying means to pneumatically convey the spent catalyst from said reaction zone to said regeneration zone, removing combustion gases from a lower point in said gravitationally descending bed of regenerated catalyst, introducing a stripping gas to strip said regenerated catalyst and discharging said stripping gas into the regeneration zone to be withdrawn therefrom together with the last-named combustion gases, removing regenerated catalyst from said regeneration zone, and introducing said catalyst into said catalyst reaction zone.

11. A process for hydrocarbon conversion, which comprises introducing hydrocarbons at an elevated temperature into one end of a gravitationally descending bed of catalyst to pass countercurrent to said catalyst in a catalytic reaction zone, removing converted vapor from the other end of said catalyst bed in said zone, removing spent catalyst carrying carbonaceous impurities from contact with said vapors in said reaction zone, introducing stripping gas into said spent catalyst and discharging said stripping gas into said reaction zone, pneumatically conveying said catalyst by means of an oxygen containing gas into the upper portion of a regeneration zone, establishing a gravitationally descending bed of catalyst in said regeneration zone and passing said gas concurrently with said catalyst through an upper portion of said bed in said regeneration zone, causing combustion to occur in said portion of said bed, withdrawing the combustion gases from an intermediate zone of said bed in said regeneration zone, cooling said combustion gases, adding fresh oxygen containing gases to said combustion gases and re-introducing said gases into an intermediate portion of said bed in said regeneration zone to pass concurrently with said gravitationally descending bed of catalyst in a lower portion of said regeneration zone, withdrawing an additional stream of combustion gases from the lower portion of said bed in said regeneration zone, cooling said last-named combustion gases, adding additional oxygen containing gases to said last-named withdrawn combustion gases, introducing such gases into said pneumatic conveying means to pneumatically convey the spent catalyst from said reaction zone to said regeneration zone, removing combustion gases from a lower point in said gravitationally descending bed of regenerated catalyst, introducing a stripping gas to strip said regenerated catalyst and discharging said stripping gas into the regeneration zone to be withdrawn therefrom together with the last-named combustion gases, removing regenerated catalyst from the reaction zone, and introducing said catalyst into said catalyst reaction zone.

12. A vapor and solid contact apparatus of the class described, comprising a reaction chamber for contact of vapors and gases at high temperature, an inlet for hot solids into the chamber, an outlet for solids from said chamber, a vapor inlet into said reaction chamber, a vapor outlet from said chamber, a regeneration chamber, means connected to the outlet from said reaction chamber for pneumatically conveying solids to said regenerator, means for gravitationally conveying hot solids from said regenerator to said reaction chamber, means for introducing regenerating gas into one end of said regeneration chamber, means for removing regenerating gas from an intermediate zone of said regeneration chamber, means for introducing fresh regenerating gas into an intermediate zone of said regeneration chamber, means for withdrawing regenerator gas from another end of said regeneration chamber, said means for introducing and withdrawing gases from said regeneration chamber including a plurality of spaced regenerating gas inlet conduits manifolded and positioned within said regenerator, a conduit connected to said gas inlet conduits for introducing regenerating gases into said gas inlet conduits, a plurality of spaced gas outlet conduits manifolded and placed within said regenerator in spaced relationship to said gas inlet conduits, and a gas withdrawal conduit connected to said gas outlet conduits, said gas inlet conduits and said gas outlet conduits being positioned in said regenerator and adapted to be surrounded by the body of solids in said regenerator and spaced to permit passage of solids between said gas inlet conduits and said gas outlet conduits to the solids outlet from said regenerator.

13. A vapor and solid contact apparatus of the class described, comprising a reaction chamber for contact of vapors and gases at high temperature, an inlet for hot solids into the chamber, an outlet for solids from said chamber, a vapor inlet into said reaction chamber, a vapor outlet from said chamber, a regeneration chamber, means connected to the outlet from said reaction chamber for pneumatically conveying solids to said regenerator, means for gravitationally conveying hot solids from said regenerator to said reaction chamber, means for introducing regenerating gas into said pneumatic conveying means and into one end of said regeneration chamber, a plurality of spaced and manifolded regenerating gas inlet conduits positioned within said regenerator, a conduit connected to said gas inlet conduits for introducing regenerating gases into said gas inlet conduits, a plurality of spaced and manifolded gas outlet conduits positioned within said regenerator in spaced relationship to said gas inlet conduits, a gas withdrawal conduit connected to said gas outlet conduits, said gas inlet conduits and said gas outlet conduits being positioned in said regenerator and adapted to be surrounded by the body of solids in said regenerator and spaced to permit passage of solids between said gas inlet conduits and said gas outlet conduits to the solids outlet from said regenerator.

14. A vapor and solids contact apparatus of the class described, which comprises a vessel, a plurality of vertically spaced compartments in said vessel, means for introducing solids into the upper portion of the upper compartment, means for withdrawing solids from the lower portion of the lower compartment, an annular funnel positioned in said vessel between said compartments adapted to pass solids from the lower portion of said upper compartment to the upper portion of the lower compartment, means for sealing said annular funnel to prevent the passage of gases from said compartments through said annular funnel, gas inlets and outlets in said compartments, and means for withdrawing solids from the lower portion of the lower compartment, and means for conveying said withdrawn solids to said upper compartment.

15. A vapor and solids contact apparatus of the class described, which comprises a vessel, a plurality of vertically spaced compartments in said vessel, means for introducing solids into the upper portion of the upper compartment, means for withdrawing solids from the lower portion of the lower compartment, an annular funnel positioned in said vessel between said compartments adapted to pass solids from the lower portion of said upper compartment to the upper portion of the lower compartment, means for sealing said annular funnel to prevent the passage of gases from said compartments through said annular funnel including means for introducing a sealing gas into said funnel, gas inlets and outlets in said compartments, means for withdrawing solids from the lower portion of the lower compartment, and means for conveying said withdrawn solids to said upper compartment.

16. A vapor and solid contact apparatus of the class described, which comprises a vessel adapted to receive and contain a moving bed of solids, means dividing the vessel into compartments, one of which constitutes a reaction compartment and the other a regenerating compartment, a solids outlet from said reaction compartment, a pneumatic conveyor conduit positioned in said vessel connected to said solids outlet from said reaction compartment and discharging into said regenerating compartment, an annular solids passageway between said regenerating compartment and said reaction compartment, a gas seal between said annular passageway and the walls of said vessel and between said annular passageway and said pneumatic conveyor conduit, a vapor inlet to said regenerating compartment, a vapor outlet from said regenerating compartment, means for introducing regeneration gases into said conduit to pneumatically convey the solids from said reaction compartment to said regenerating compartment, and means for withdrawing gases from said regenerating compartment.

17. A vapor and solid contact apparatus of the class described, which comprises a vessel adapted to receive and contain a moving bed of solids, means dividing the vessel into compartments, one of which constitutes a reaction compartment and the other a regenerating compartment, a solids outlet from said reaction compartment, a pneumatic conveyor conduit positioned in said vessel connected to said solids outlet from said reaction compartment and discharging into said regenerating compartment, an annular solids passageway between said regenerating compartment and said reaction compartment, a gas seal between said annular passageway and the walls of said vessel and between said annular passageway and said pneumatic conveyor conduit, means for introducing a sealing gas into said annular passageway, a vapor inlet to said regenerating compartment, a vapor outlet from said regenerating compartment, means for introducing regeneration gases into said conduit to pneumatically convey the solids from said reaction compartment to said regenerating compartment, and means for withdrawing gases from said regenerating compartment.

18. A vapor and solid contact apparatus of the class described, comprising a reaction chamber for contact of vapors and gases at high temperature, an inlet for hot solids into the chamber, an outlet for solids from said chamber, a vapor inlet into said reaction chamber, a vapor outlet from said chamber, a regeneration chamber, means connected to the outlet from said reaction chamber for pneumatically conveying solids directly to said regeneration chamber, a solids inlet to said regeneration chamber, means for introducing said solids from said pneumatic conveying means directly into said solids inlet, means for gravitationally conveying hot solids from said regeneration chamber to said reaction chamber, means for introducing regenerating gas into said pneumatic conveying means and into one end of said regeneration chamber, means for passing said regenerating gases along with solids through said regeneration chamber, means for removing regenerating gas from an intermediate zone of said regeneration chamber, means for introducing fresh regenerating gas into an intermediate zone of said regeneration chamber, and means for withdrawing regenerator gas from another end of said regeneration chamber, said means for introducing regenerating gases and withdrawing gases from said regeneration chamber being adapted for the passage of solids from the solids inlet of said regeneration chamber to the solids outlet of said regeneration chamber.

19. A vapor and solid contact apparatus of the class described, comprising a reaction chamber for contact of vapors and gases at high temperature, an inlet for hot solids into the chamber, an outlet for solids from said chamber, a vapor inlet into said reaction chamber, a vapor outlet from said chamber, a regenerating chamber, means connected to the outlet from said reaction chamber for pneumatically conveying solids directly to said regenerating chamber, a solids inlet to said regenerating chamber, means for introducing said solids from said pneumatic conveying means directly into said solids inlet, means for gravitationally conveying hot solids from said regenerating chamber to said reaction chamber, means for introducing regenerating gas into one end of said regenerating chamber, means for passing said regenerating gases along with solids through said regenerating chamber, means for removing regenerating gas from an intermediate zone of said regenerating chamber, means for introducing fresh regenerating gas into an intermediate zone of said regenerating chamber, means for withdrawing regenerator gas from another end of said regenerating chamber, said means for introducing regenerating gases and withdrawing gases from said regenerating chamber being adapted for the passage of solids from the solids inlet of said regenerating chamber to the solids outlet of said regenerating chamber, means for preventing gases and vapors in said regenerating chamber from entering said reaction chamber, and means for preventing vapors and gases in said reaction chamber from entering said regenerating chamber.

VIRGIL V. JACOMINI.

REFERENCES CITED

The following references are of record in the file of this patent:

UNITED STATES PATENTS

| Number | Name | Date |
|---|---|---|
| 1,380,067 | Koch et al. | May 31, 1921 |
| 2,223,268 | Plummer I | Nov. 26, 1940 |
| 2,248,196 | Plummer II | July 8, 1941 |
| 2,274,003 | Sheppard | Feb. 24, 1942 |
| 2,290,580 | Degnen et al. | July 21, 1942 |
| 2,304,128 | Thomas | Dec. 8, 1942 |
| 2,311,984 | Guild | Feb. 23, 1943 |
| 2,312,006 | Thiele | Feb. 23, 1943 |
| 2,320,318 | Simpson et al. | May 25, 1943 |
| 2,320,562 | Bransky | June 1, 1943 |
| 2,331,433 | Simpson et al. | Oct. 12, 1943 |
| 2,334,553 | Harding | Nov. 16, 1943 |
| 2,337,684 | Scheineman | Dec. 28, 1943 |
| 2,341,193 | Scheineman | Feb. 8, 1944 |
| 2,347,682 | Gunness | May 2, 1944 |
| 2,362,621 | Fahnestock | Nov. 14, 1944 |
| 2,363,874 | Krebs | Nov. 28, 1944 |
| 2,372,018 | Ruthruff | Mar. 20, 1945 |
| 2,384,932 | Lechthaler | Sept. 8, 1945 |

Certificate of Correction

Patent No. 2,440,475.                                                                 April 27, 1948.

VIRGIL V. JACOMINI

It is hereby certified that error appears in the printed specification of the above numbered patent requiring correction as follows: Column 16, line 53, claim 5, strike out the comma and words ", removing converted vapor from the other" and insert instead *and pneumatically conveying said catalyst*; and that the said Letters Patent should be read with this correction therein that the same may conform to the record of the case in the Patent Office.

Signed and sealed this 22nd day of June, A. D. 1948.

[SEAL]

THOMAS F. MURPHY,
*Assistant Commissioner of Patents.* preventing gases and vapors in said regenerating chamber from entering said reaction chamber, and means for preventing vapors and gases in said reaction chamber from entering said regenerating chamber.

VIRGIL V. JACOMINI.

REFERENCES CITED

The following references are of record in the file of this patent:

UNITED STATES PATENTS

| Number | Name | Date |
| --- | --- | --- |
| 1,380,067 | Koch et al. | May 31, 1921 |
| 2,223,268 | Plummer I | Nov. 26, 1940 |
| 2,248,196 | Plummer II | July 8, 1941 |
| 2,274,003 | Sheppard | Feb. 24, 1942 |
| 2,290,580 | Degnen et al. | July 21, 1942 |
| 2,304,128 | Thomas | Dec. 8, 1942 |
| 2,311,984 | Guild | Feb. 23, 1943 |
| 2,312,006 | Thiele | Feb. 23, 1943 |
| 2,320,318 | Simpson et al. | May 25, 1943 |
| 2,320,562 | Bransky | June 1, 1943 |
| 2,331,433 | Simpson et al. | Oct. 12, 1943 |
| 2,334,553 | Harding | Nov. 16, 1943 |
| 2,337,684 | Scheineman | Dec. 28, 1943 |
| 2,341,193 | Scheineman | Feb. 8, 1944 |
| 2,347,682 | Gunness | May 2, 1944 |
| 2,362,621 | Fahnestock | Nov. 14, 1944 |
| 2,363,874 | Krebs | Nov. 28, 1944 |
| 2,372,018 | Ruthruff | Mar. 20, 1945 |
| 2,384,932 | Lechthaler | Sept. 8, 1945 |

Certificate of Correction

Patent No. 2,440,475.  April 27, 1948.

VIRGIL V. JACOMINI

It is hereby certified that error appears in the printed specification of the above numbered patent requiring correction as follows: Column 16, line 53, claim 5, strike out the comma and words ", removing converted vapor from the other" and insert instead *and pneumatically conveying said catalyst*; and that the said Letters Patent should be read with this correction therein that the same may conform to the record of the case in the Patent Office.

Signed and sealed this 22nd day of June, A. D. 1948.

[SEAL]

THOMAS F. MURPHY,
*Assistant Commissioner of Patents.*